United States Patent
Endo et al.

(10) Patent No.: US 8,155,779 B2
(45) Date of Patent: Apr. 10, 2012

(54) NUMERICAL CONTROLLER WITH TABULAR DATA FOR OPERATING ARBITRARY AXES

(75) Inventors: Takahiko Endo, Minamitsuru-gun (JP); Yasushi Takeuchi, Minamitsuru-gun (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 379 days.

(21) Appl. No.: 12/472,567

(22) Filed: May 27, 2009

(65) Prior Publication Data

US 2010/0004760 A1 Jan. 7, 2010

(30) Foreign Application Priority Data

Jul. 3, 2008 (JP) ................................. 2008-174396

(51) Int. Cl.
*G06F 19/00* (2011.01)
(52) U.S. Cl. .......... 700/186; 700/61; 700/193; 700/253; 318/569; 318/574; 318/575
(58) Field of Classification Search ............ 700/56, 700/61, 186, 181–182, 193, 253; 409/80, 409/88; 493/2–3, 34; 318/569, 574–575
See application file for complete search history.

(56) References Cited

U.S. PATENT DOCUMENTS

| | | | |
|---|---|---|---|
| 4,692,856 A | 9/1987 | Komiya | |
| 6,885,909 B2 | 4/2005 | Isohata | |
| 7,155,303 B2 * | 12/2006 | Sagasaki et al. | ............. 700/173 |
| 7,274,165 B2 * | 9/2007 | Takeuchi et al. | .............. 318/567 |
| 7,480,541 B2 * | 1/2009 | Endo et al. | ..................... 700/186 |
| 7,552,002 B2 * | 6/2009 | Endo et al. | ....................... 701/50 |
| 7,580,770 B2 * | 8/2009 | Endo et al. | ..................... 700/186 |
| 7,774,088 B2 * | 8/2010 | Yamada | ......................... 700/169 |
| 2002/0118229 A1 * | 8/2002 | Batori et al. | .................. 345/771 |

(Continued)

FOREIGN PATENT DOCUMENTS

DE 10343809 4/2004

(Continued)

OTHER PUBLICATIONS

Japanese Notice of Reasons for Rejection mailed Apr. 13, 2010 issued in Japanese Application No. 2008-174396 (including a partial translation thereof).

(Continued)

*Primary Examiner* — Ramesh Patel
(74) *Attorney, Agent, or Firm* — Drinker Biddle & Reath LLP

(57) ABSTRACT

A numerical controller including a storage device for storing tabular data configured to operate one arbitrary axis, in which a position of a spindle or an axis as a control object is caused to correspond to a reference value composed of time or the position of a reference spindle or axis. A reading device is provided for successively reading a reference value in the tabular data and a position of the spindle or the axis as control object corresponding to the reference value from the storage device, and controls the position of the spindle or the axis as control object based on the reference value read by the reading device. An assignment device is provided for assigning the axis to be operated in accordance with the tabular data, and a starting device for starting the tabular data stored in the storage device, thereby causing the axis assigned by the assigning device to operate.

3 Claims, 15 Drawing Sheets

U.S. PATENT DOCUMENTS

| | | | |
|---|---|---|---|
| 2003/0120373 A1* | 6/2003 | Eames | 700/128 |
| 2004/0138776 A1* | 7/2004 | Baumann et al. | 700/187 |
| 2005/0209712 A1* | 9/2005 | Sagasaki et al. | 700/28 |
| 2009/0053004 A1* | 2/2009 | Yamaura et al. | 409/165 |

FOREIGN PATENT DOCUMENTS

| | | |
|---|---|---|
| EP | 1 353 251 | 12/2004 |
| JP | 59-177604 | 10/1984 |
| JP | 2001-306150 | 11/2001 |
| JP | 2003-303005 | 10/2003 |

OTHER PUBLICATIONS

German Office Action mailed Oct. 4, 2010 issued in DE Application No. 10 2009 026 570.8-32 (including a partial translation thereof).

* cited by examiner

FIG. 4    PRIOR ART

PATH TABLE FOR X-AXIS

| PATH TABLE NUMBER AND AXIS NAME | |
| --- | --- |
| 1000_X | |
| REFERENCE VALUE (TIME OR SPINDLE POSITION) | POSITION |
| L0 | X0 |
| L1 | X1 |
| L2 | X2 |
| L3 | X3 |

FIG. 5   PRIOR ART

PATH TABLE FOR A-AXIS

| PATH TABLE NUMBER AND AXIS NAME ||
|---|---|
| 1000_A ||
| REFERENCE VALUE (TIME OR SPINDLE POSITION) | POSITION |
| L0 | X0 |
| L1 | X1 |
| L2 | X2 |
| L3 | X3 |

PATH TABLE FOR OPERATING ARBITRARY AXIS

| PATH TABLE NUMBER | |
|---|---|
| 3 | |
| REFERENCE VALUE (TIME OR SPINDLE POSITION) | POSITION |
| L0 | X0 |
| L1 | X1 |
| L2 | X2 |
| L3 | X3 |

| | #7 | #6 | #5 | #4 | #3 | #2 | #1 | #0 |
|---|---|---|---|---|---|---|---|---|
| G0700 | | | | | | | | PTS |

FIG. 16

| | #7 | #6 | #5 | #4 | #3 | #2 | #1 | #0 |
|---|---|---|---|---|---|---|---|---|
| G0701 | PTN8 | PTN7 | PTN6 | PTN5 | PTN4 | PTN3 | PTN2 | PTN1 |

FIG. 17

| | 1ST PATH TABLE | 2ND PATH TABLE | 3RD PATH TABLE | 4TH PATH TABLE | ... | 254TH PATH TABLE | 255TH PATH TABLE |
|---|---|---|---|---|---|---|---|
| #0 | 1 | 0 | 1 | 0 | ... | 0 | 1 |
| #1 | 0 | 1 | 1 | 0 | ... | 1 | 1 |
| #2 | 0 | 0 | 0 | 1 | ... | 1 | 1 |
| #3 | 0 | 0 | 0 | 0 | ... | 1 | 1 |
| #4 | 0 | 0 | 0 | 0 | ... | 1 | 1 |
| #5 | 0 | 0 | 0 | 0 | ... | 1 | 1 |
| #6 | 0 | 0 | 0 | 0 | ... | 1 | 1 |
| #7 | 0 | 0 | 0 | 0 | ... | 1 | 1 |
| | G0701 | G0701 | G0701 | G0701 | ... | G0701 | G0701 |

FIG. 18

| G0702 | #7<br>PTA8 | #6<br>PTA7 | #5<br>PTA6 | #4<br>PTA5 | #3<br>PTA4 | #2<br>PTA3 | #1<br>PTA2 | #0<br>PTA1 |

FIG. 19

| | 1ST AXIS (e.g., X-AXIS) | 2ND AXIS (e.g., A-AXIS) | 3RD AXIS | 4TH AXIS | ... | 7TH AXIS | 8TH AXIS |
|---|---|---|---|---|---|---|---|
| #0 | 1 | 0 | 0 | 0 | ... | 0 | 0 |
| #1 | 0 | 1 | 0 | 0 | ... | 0 | 0 |
| #2 | 0 | 0 | 1 | 0 | ... | 0 | 0 |
| #3 | 0 | 0 | 0 | 1 | ... | 0 | 0 |
| #4 | 0 | 0 | 0 | 0 | ... | 0 | 0 |
| #5 | 0 | 0 | 0 | 0 | ... | 0 | 0 |
| #6 | 0 | 0 | 0 | 0 | ... | 1 | 0 |
| #7 | 0 | 0 | 0 | 0 | ... | 0 | 1 |
| | G0702 | G0702 | G0702 | G0702 | ... | G0702 | G0702 |

FIG. 20

PATH TABLE FOR X-AXIS

| PATH TABLE NUMBER AND AXIS NAME | |
|---|---|
| 7000_X | |
| REFERENCE VALUE (TIME OR SPINDLE POSITION) | POSITION OR START COMMAND AND AXIS ASSIGNMENT COMMAND |
| L0 | X0 |
| L1 | X1 |
| L2 | Q3F12 |
| L3 | X3 |

NUMERICAL CONTROLLER WITH TABULAR DATA FOR OPERATING ARBITRARY AXES

RELATED APPLICATION DATA

This application claims priority under 35 U.S.C. §119 and/or §365 to Japanese Application No. 2008-174396 filed Jul. 3, 2008, the entire contents of which are incorporated herein by reference.

BACKGROUND OF THE INVENTION

1. Field of the Invention

The present invention relates to a numerical controller for controlling a machine tool, and more particularly, to a numerical controller for controlling axes of a machine tool based on data stored in a table.

2. Description of the Related Art

There is conventionally known a numerical controller having a function (path-table operation function) such that tabular data (path tables) in which the respective positions of axes as control objects are set based on time or the position of a spindle or axis are successively read as the axes are driven, not the command by the block of NC program. Based on this path-table operation function, a tool can be freely operated without regard to a machining program, thus ensuring a reduction in machining time and higher-performance machining.

A numerical control method in which the positional relationships between time (or rotation angle) and movable axes are stored as numerical control data is disclosed in, for example, Japanese Patent Application Laid-Open No. 59-177604 as a related prior art technique. The time (or rotation angle) is monitored, and numerical control data corresponding to the time (or rotation angle) is output to the movable axes every time the time (or rotation angle) reaches a time (or rotation angle) commanded by the numerical control data.

Further, a numerical controller provided with a data table for storing command positions of X- and A-axes compared with a reference position is disclosed in Japanese Patent Application Laid-Open No. 2003-303005. The reference position is obtained by multiplying a value in a counter for counting reference pulses by an override value. Based on this obtained reference position, the command positions of the X- and Z-axes stored in the data table are output to control the X- and Z-axes synchronously. By doing this, overriding can be performed even in controlling the drive based on the data stored in the data table. Further, a command may be issued such as to connect the command positions by means of a straight line, quadric curve, or cubic curve, and in addition, to allow an auxiliary function to be commanded.

In the case of a large gantry machine shown in FIG. 1 where a gantry is driven by the X- and A-axes, these axes are controlled so as to operate with the same route pattern. In running the large gantry machine based on tabular data (path tables), it is necessary to provide path tables for the X- and A-axes, individually, although the path tables have the same contents.

In an operation based on conventional tabular data (path tables), as described above, it is necessary to create the tabular data for each movable axis. The tabular data contain the respective positions of the movable axes based on time or the position of an axis (or spindle) and movable axis names. A memory in the numerical controller should be preloaded with the created tabular data.

Therefore, even in the case of FIG. 1 where the movable axes (X- and A-axes) are commanded to have the same route pattern (see FIGS. 2 and 3), for example, the tabular data (path tables) that contain the respective positions of the movable axes based on time or the position of an axis (or spindle) and are different only in axis name have to be created individually for the X- and A-axes (see FIGS. 4 and 5).

FIG. 6 shows an example of an NC program for starting tabular data (path tables).

In FIG. 6, "M700" of a block "M700Q1000" represents an M code for starting a path-table operation. "Q1000" represents each $1000^{th}$ path table. When a command from "M700Q1000" is executed, a $1000^{th}$ path table (FIG. 4) for the X-axis and a $1000^{th}$ path table (FIG. 5) for the A-axis are started to operate the X- and A-axes.

FIG. 4 shows an example of a path table for the X-axis. "1000_X" in this path table represents the $1000^{th}$ path table for the X-axis. Thus, the "$1000^{th}$" path table and the "X-axis" as a controlled axis are assigned in this example. Further, the "position" of the X-axis as the controlled axis is correlated with a "reference value" for time or the position of a reference spindle.

FIG. 5 shows an example of a path table for the A-axis. "1000_A" in this path table represents the $1000^{th}$ path table for the A-axis. Thus, the "$1000^{th}$" path table and the "A-axis" as a controlled axis are assigned in this example. Further, the "position" of the A-axis as the controlled axis is correlated with a "reference value" for time or the position of a reference spindle.

The data "reference value" and "position" in the path table for the A-axis in FIG. 5 are the same as those in the path table for the X-axis in FIG. 4. Thus, the two identical tabular data (path tables) must be stored in the memory of the numerical controller, so that the memory capacity for the storage inevitably gets larger.

SUMMARY OF THE INVENTION

Accordingly, in the case of the present invention, tabular data (path table) for operating one arbitrary unassigned axis is created in advance so that the tabular data can be shared by a plurality of arbitrary axes, thereby suppressing an increase in capacity for storing such tabular data (path table).

A numerical controller according to the present invention comprises storage means for storing tabular data, in which a position of a spindle or an axis as a control object is caused to correspond to a reference value composed of time or the position of a reference spindle or axis, and reading means for successively reading a reference value in the tabular data and a position of the spindle or the axis as control object corresponding to the reference value from the storage means, and controls the position of the spindle or the axis as the control object based on the reference value read by the reading means. In the present invention, the tabular data stored in the storage means is configured to operate one arbitrary axis. The numerical controller further comprises assignment means for assigning the axis to be operated in accordance with the tabular data and starting means for starting the tabular data stored in the storage means, thereby causing the axis assigned by the assigning means to operate.

The starting means may be an NC program command, signal input, or a command for some other tabular data. Further, the assigning means may be an NC program command, signal input, or a command for the other tabular data constituting the starting means.

According to the present invention, the tabular data (path table) for operating one arbitrary axis is created and shared by a plurality of axes to be controlled by the numerical controller, with the result that a capacity for tabular data to be stored in a memory of the numerical controller can be reduced.

BRIEF DESCRIPTION OF THE DRAWINGS

The above and other objects and features of the present invention will be obvious from the ensuing description of embodiments with reference to the accompanying drawings, in which:

FIG. 4 is a diagram showing a path table for the X-axis in a conventional controller;

FIG. 5 is a diagram showing a path table for the A-axis in a conventional controller;

FIG. 6 shows an example of an NC program for starting a path table based on the prior art;

FIG. 13 shows tabular data (path table) for operating one arbitrary axis without axis assignment, stored in the numerical controller of the invention;

FIG. 14 shows an example of an NC program for starting the tabular data (path table) for operating one arbitrary axis without axis assignment;

FIG. 15 shows an example of a signal for starting a path table for operating an arbitrary axis;

FIG. 16 shows an example of a signal for assigning the path table for operating an arbitrary axis;

FIG. 17 is a diagram illustrating the correspondence between path table numbers and the signal for assigning the path table for operating an arbitrary axis;

FIG. 18 shows an example of a signal for assigning an axis number for a path table for operating an arbitrary axis;

FIG. 19 is a diagram illustrating the correspondence between axis numbers of axes to be operated and the signal for assigning the axis numbers; and FIG. 20 is a diagram showing another path table for starting the path table for operating an arbitrary axis and assigning axes to be operated by the started path table.

DETAILED DESCRIPTION OF THE PREFERRED EMBODIMENTS

Figure 7:
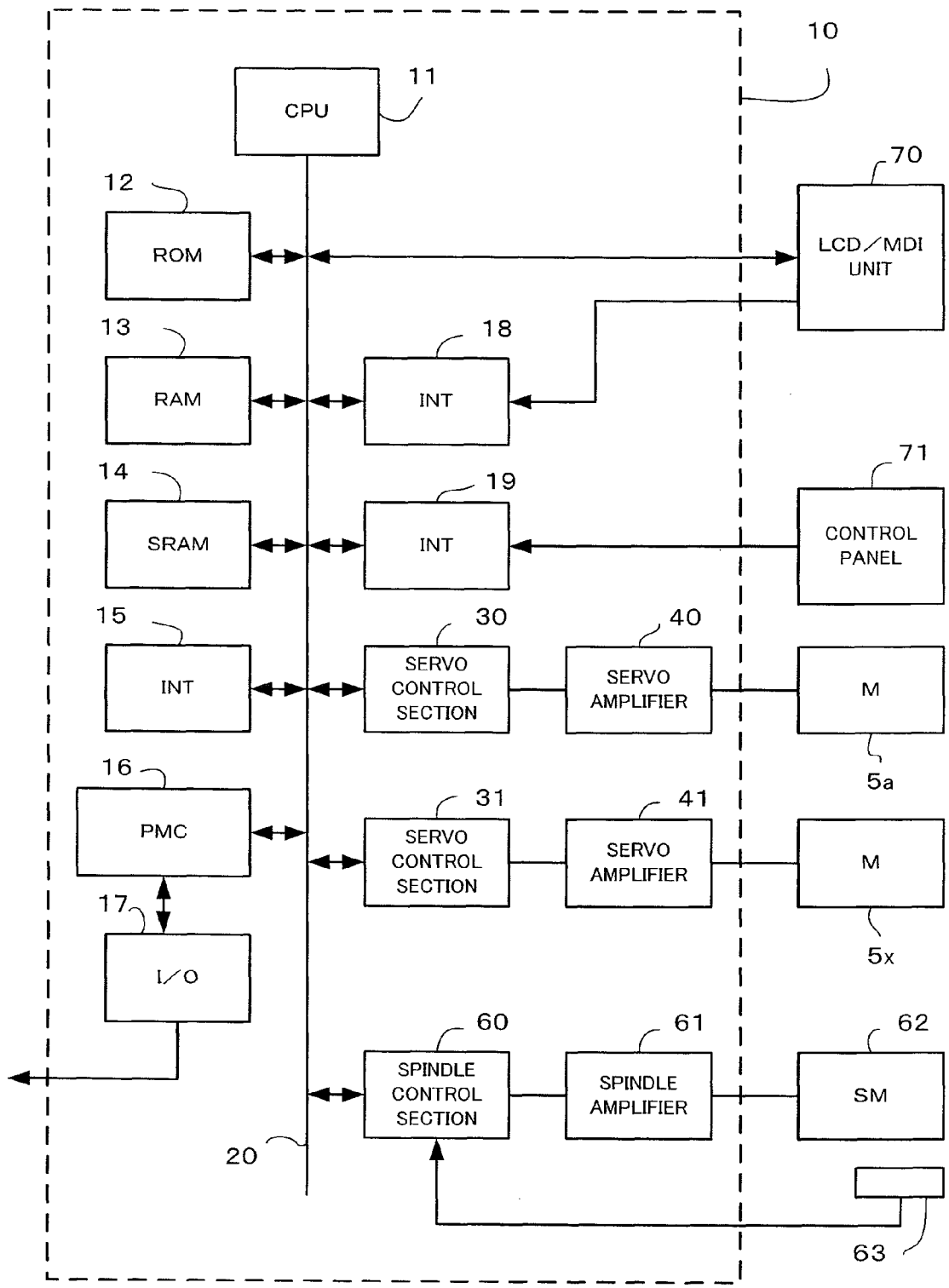
FIG. 7 is a block diagram showing principal parts of one embodiment of a numerical controller according to the present invention.

FIG. 7 is a block diagram showing principal parts of one embodiment of a numerical controller 10 according to the present invention for driving a machine tool that has tabular data for operating arbitrary axes.

A CPU 11 reads a system program from a ROM 12 through a bus 20, and controls the entire numerical controller in accordance with the read system program. A RAM 13 is loaded with temporary calculation data, display data, and various data input through a liquid crystal display/manual data input unit (LCD/MDI unit) 70 by an operator. An SRAM 14 is constructed as a nonvolatile memory that is backed up by a battery (not shown) so that it can maintain a storage state even after the numerical controller 10 is switched off. The SRAM 14 is stored with machining programs read through an interface 15, machining programs input through the LCD/MDI unit 70, etc. Further, the SRAM 14 is previously loaded with the aforementioned tabular data for operating arbitrary axes. Furthermore, the ROM 12 is previously loaded with various system programs for performing edit mode processing needed to create and edit the machining programs and processing for an automatic operation.

The interface 15 enables connection between the numerical controller 10 and external devices. A programmable machine controller (PMC) 16 outputs a signal to an auxiliary device of the machine tool through an I/O unit 17 in accordance with a sequence program stored in the numerical controller 10, thereby controlling the auxiliary device. Further, the PMC 16 receives and properly processes signals from various switches on a control panel on the main body of the machine tool, and then delivers the processed signals to the CPU 11. The LCD/MDI unit 70 is a manual data input unit equipped with a display and keyboard, and an interface 18 receives commands and data from the keyboard of the LCD/MDI unit 70 and delivers them to the CPU 11. An interface 19 is connected to a control panel 71 and receives various commands from the control panel 71.

On receipt of move commands for individual axes from the CPU 11, servo control sections 30 and 31 for the axes output axis commands to servo amplifiers 40 and 41, respectively. In response to these commands, the servo amplifiers 40 and 41 drive servomotors 5x and 5a for the axes, respectively. The servomotors 5x and 5a contain position/speed detectors (not shown), individually, and feed back position and speed feedback signals from the position/speed detectors to the servo control sections 30 and 31, respectively, thereby executing position and speed feedback control. An arrangement for position and speed feedback to the servo control sections 30 and 31 is not shown in FIG. 7.

On receipt of a spindle command, a spindle control section 60 outputs a spindle speed signal to a spindle amplifier 61. On receipt of the spindle speed signal, the spindle amplifier 61 rotates a spindle motor 62 for driving a spindle at a commanded rotational speed. Speed control is performed as a position detector 63 feeds back feedback pulses (reference pulses) and a one-revolution signal to the spindle control section 60 in synchronism with the spindle rotation. The feedback pulses and one-revolution signal are read by the CPU 11 through the spindle control section 60. The feedback pulses (reference pulses) are counted by a counter (not shown) in the RAM 13. In some cases, moreover, the counter may be configured to count spindle command pulses in place of the feedback pulses. Although FIG. 7 shows A- and X-axes as axes to be controlled by the numerical controller 10, it is to be understood that some other axes may also be controlled.

For a better understanding of the invention, an outline of a prior art path-table operation will now be described with reference to FIG. 8. In the path-table operation, the machine tool is operated based on tabular data that are prepared individually for the axes of a control object.

Figure 2:
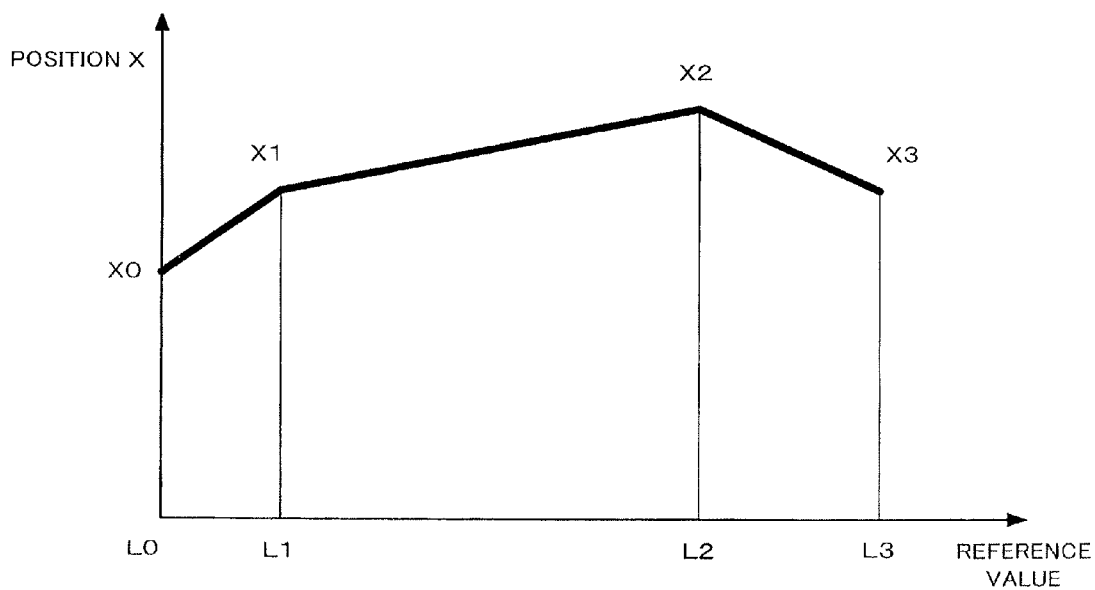
FIG. 2 is a diagram showing the relationship between a reference value and a position X in a conventional controller.
Figure 3:
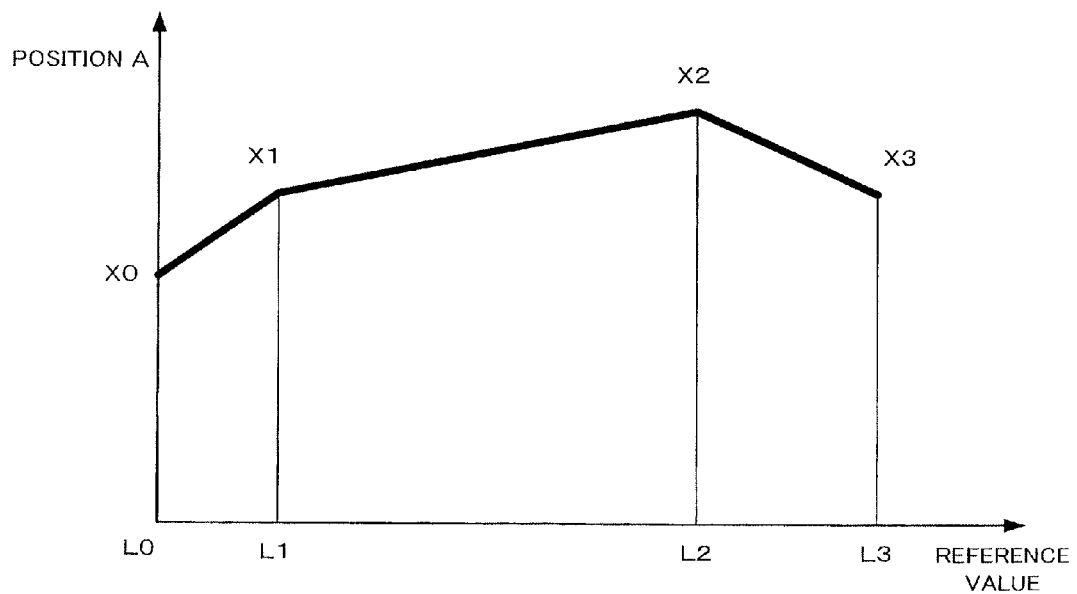
FIG. 3 is a diagram showing the relationship between the reference value and a position A in a conventional controller.

In a numerical controller that performs the path-table operation, a memory is stored with a path table Tx for the X-axis and a path table Ta for the A-axis. As shown in FIGS. 2 and 3, the path tables Tx and Ta for the X- and A-axes are expressed by tabular graphs in which an axis of abscissa represents reference values (time or the position of a reference spindle) and an axis of ordinate represents X- or A-axis positions, respectively. As shown in FIG. 4 or 5, for example, X- and A-axis command positions X0, X1, X2, ... are set corresponding to reference values L0, L1, L2, ..., respectively.

Figure 8:
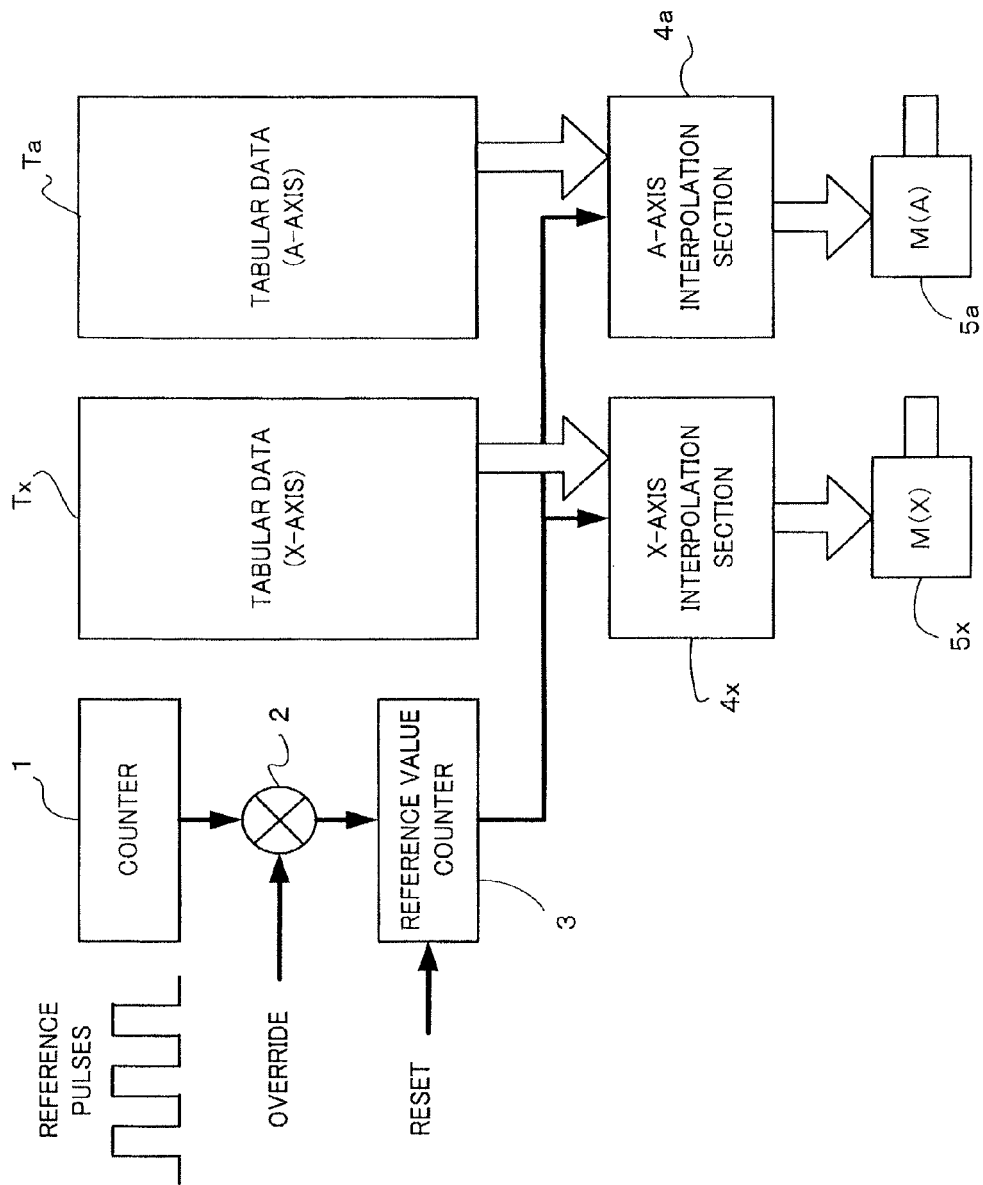
FIG. 8 is a diagram showing a conventional controller provided with tabular data for each of axes (X- and A-axes) as control objects.

Output pulses from a position detector mounted on the spindle, command pulses for the spindle, or time-based pulses from an external pulse generator are input to a counter 1 shown in FIG. 8 and counted therein. The resulting count value of the counter 1 is multiplied by a factor set in override means by a multiplier 2, and the resulting product is loaded into a reference value counter 3. The reference value counter 3 is reset when a path-table operation function is commanded or in response to the first one-revolution signal from a reference axis after the path-table operation function is commanded.

Count values of the reference value counter 3 are input as "reference values" to path-table operation interpolation sections 4x and 4a, individually. Thereupon, positions of the X- and A-axes corresponding to the input "reference values" are obtained as command positions with reference to the path tables Tx and Ta for the X- and A-axes. A movement amount for a processing period is obtained based on the thus obtained command positions, and the obtained movement amount is output as a command to amplifiers of the motors 5x and 5a for the control axes (X- and A-axes). In this manner, the X- and A-axes are synchronously operated in accordance with the reference values (times or spindle positions).

The numerical controller of the present invention having the tabular data for operating arbitrary axes will now be described with reference to FIG. 9. Like numerals are used to designate like elements in FIGS. 8 and 9.

Figure 9:
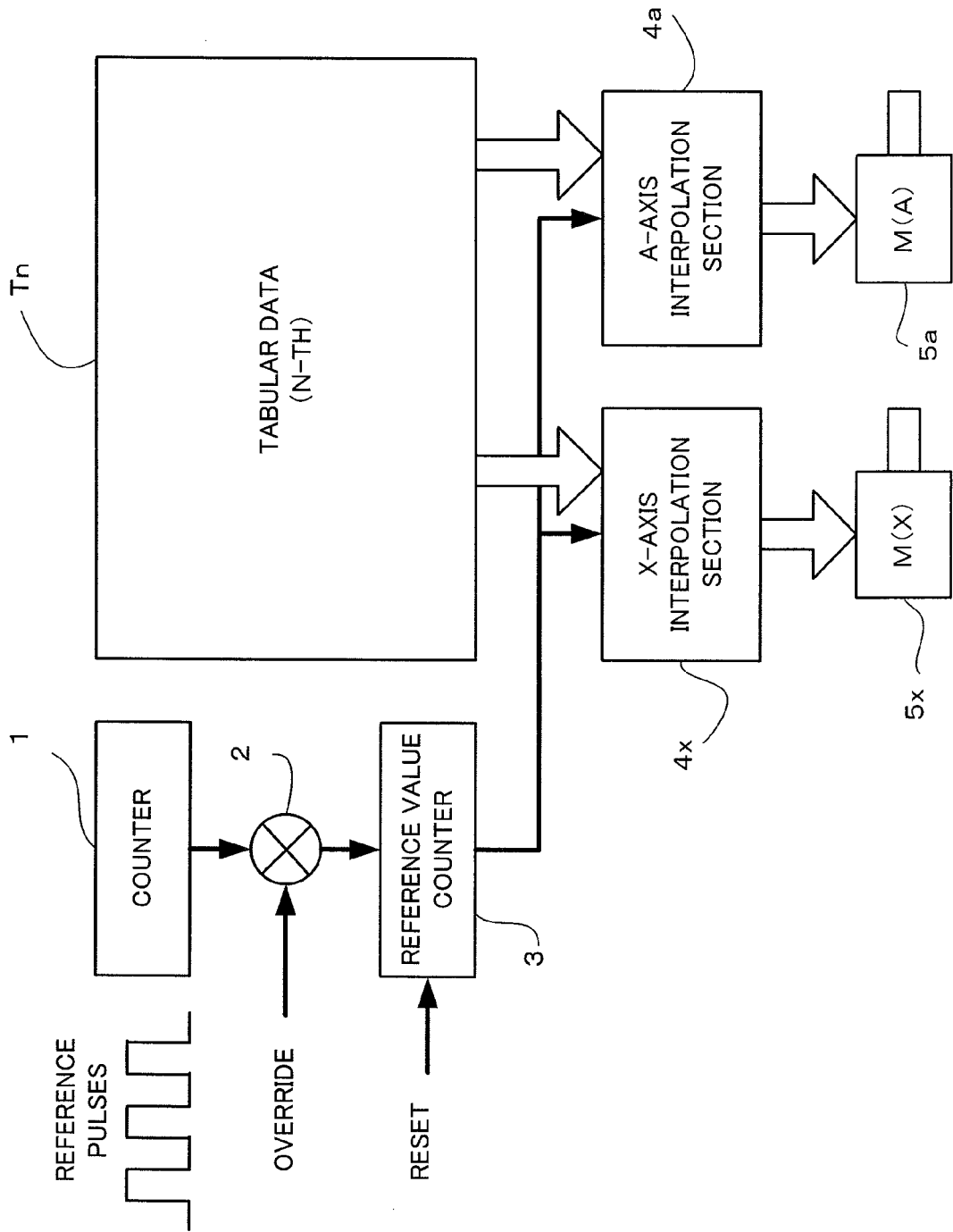
FIG. 9 is a diagram showing the numerical controller of the invention provided with one common tabular data (for operating one arbitrary axis without axis assignment) for a plurality of axes (X- and A-axes) as control objects.

FIG. 9 shows an example of the numerical controller that uses tabular data specified by a number (i.e., N), not by the name of each axis of the control object, and used in common for the movement control of the X- and A-axes.

Figure 1:
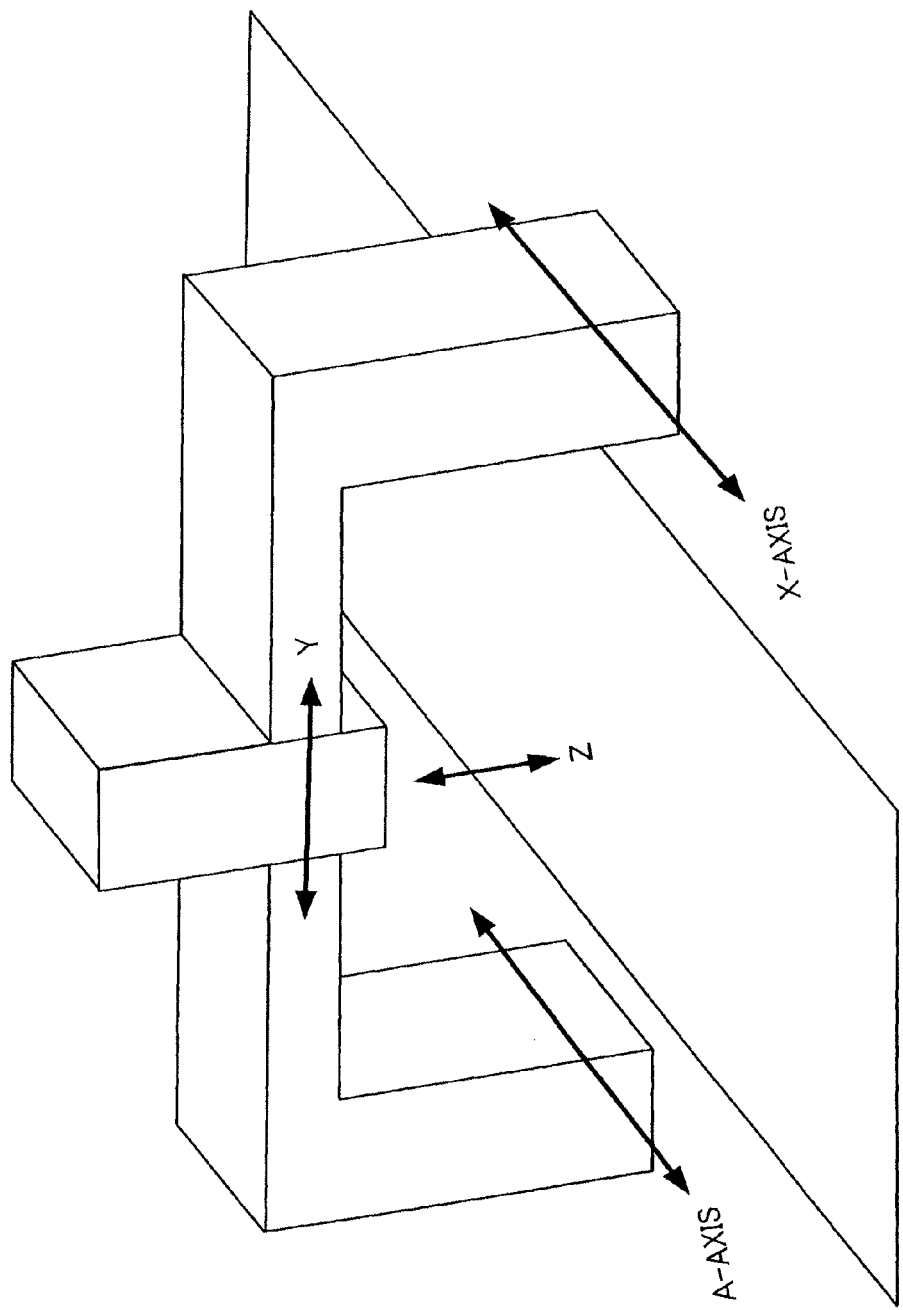
FIG. 1 is a schematic view of a conventional, large gantry machine, suggesting that path tables for X- and A-axes will have the same route pattern when driving the gantry with the X- and A-axes.

As shown in FIG. 1, the A- and X-axes synchronously operate with the same pattern. Thereupon, the tabular data for operating the X-axis is expected to be used in common with the tabular data for operating the A-axis. In this case, the N-th tabular data is used in common for the X- and A-axes. As shown in FIG. 13, for example, the N-th tabular data is one of path tables for operating arbitrary axes, not assigned ones, and is specified by a path-table number (e.g., 3).

Output pulses from a position detector mounted on the spindle, command pulses for the spindle, or time-based pulses from an external pulse generator are input to a counter 1 and counted therein. The resulting count value of the counter 1 is multiplied by a factor set in override means by a multiplier 2, and the resulting product is loaded into a reference value counter 3.

Count values of the reference value counter 3 are input as "reference values" to path-table operation interpolation sections 4x and 4a, individually. Thereupon, positions of the X- and A-axes corresponding to the input "reference values" are obtained as command positions with reference to the N-th tabular data. A movement amount for a processing period is obtained based on the thus obtained command positions, and the obtained movement amount is output as a command to amplifiers of motors 5x and 5a for the control axes (X- and A-axes). In this manner, the X- and A-axes are synchronously operated in accordance with the reference values (time or the position of a reference spindle).

Processing by the numerical controller of the present invention, including path-table interpolation processing executed for each predetermined period in FIG. 7, will now be described with reference to FIGS. 10, 11 and 12. The following is a description of a case where axes (arbitrary axes,) operated based on tabular data without axis assignment are X- and A-axes.

Figure 10:
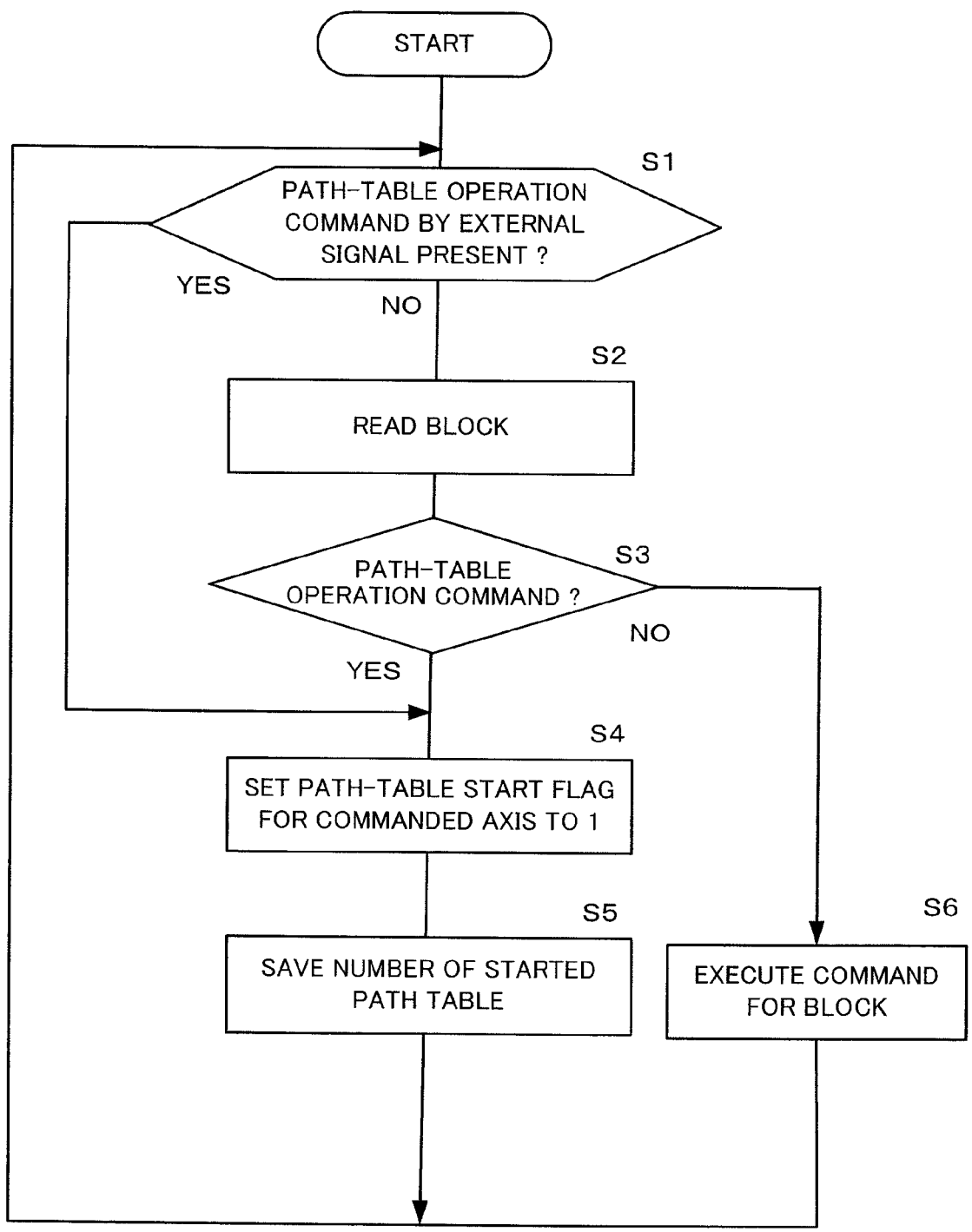
FIG. 10 is a flowchart showing an algorithm of processing for setting a path-table operation start flag for each axis.

FIG. 10 shows an algorithm of processing for setting a path-table operation start flag for each axis. The following is a description of steps of this processing. In the present invention, an NC program command, a command responsive to an external signal, or a command based on tabular data is used as a path-table operation start command for each axis. The NC program command and the command responsive to the external signal will be described with reference to FIG. 10. Further, the command based on the tabular data will be described with reference to FIGS. 11 and 12.

In the processing of FIG. 10, the CPU 11 first determines whether or not the path-table operation command responsive to the external signal is issued (Step S1). If the path-table operation command is not issued, a block of an NC program is read (Step S2). Then, it is determined whether or not the read block is the path-table operation command (Step S3). If not, a command for the block is executed (Step S6).

If it is concluded that the path-table operation command responsive to the external signal is issued (YES in Step S1) or that the read block is the path-table operation command (YES in Step S3), on the other hand, a path table start flag for the commanded axis is set to 1 (Step S4), and the number of a path table commanded by the path-table operation command and started is then loaded into a register (Step S5).

Figure 11:
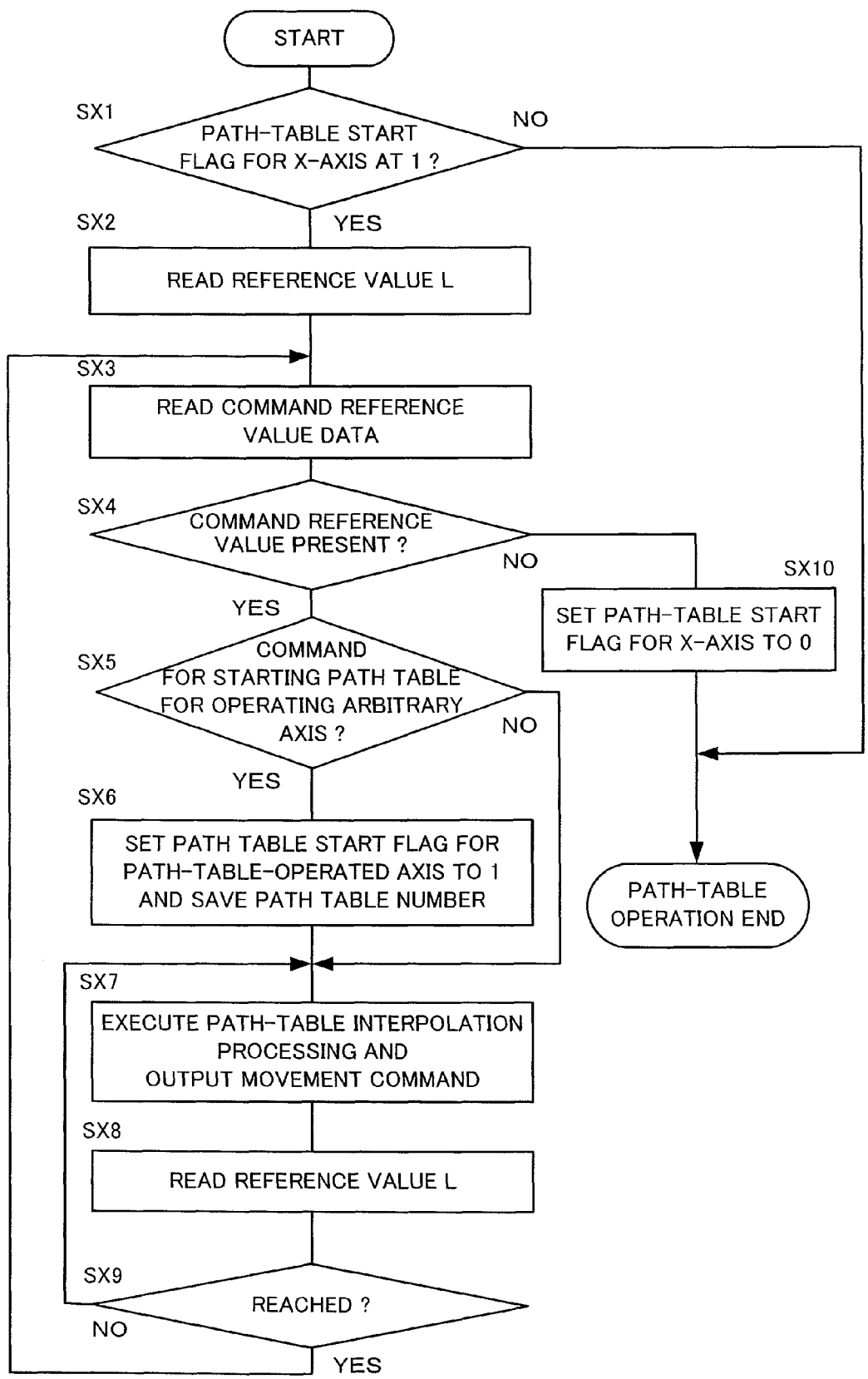
FIG. 11 is a flowchart illustrating X-axis interpolation processing using the tabular data of FIG. 9.

FIG. 11 is a flowchart illustrating X-axis interpolation processing executed by the path-table operation interpolation section 4x of the numerical controller of FIG. 9.

The CPU 11 first determines whether or not the flag for starting the path-table operation for the X-axis is set to 1 (Step SX1). If the flag is not set to 1, the path-table operation processing is terminated. If the flag is set to 1, a reference value L (time or the position of a reference spindle) to be sequentially updated is read (Steps SX2). In starting the path table, the reference value L is reset (see "RESET" of the reference value counter 3 shown in FIG. 9).

Subsequently, a command reference value (commanded time or spindle position) and command position data are read from the path table (Step SX3). Then, it is determined whether or not there is a command reference value (Step SX4). If not, the path table start flag for the X-axis is set to 0 (Step SX10), and the path-table operation is terminated. If there is the command reference value, on the other hand, it is determined whether or not the command is a command for starting the path table in order to move an arbitrary axis corresponding to the command reference value (Step SX5).

If it is concluded in Step SX5 that the command is a command for starting the path table, the path table start flag for the axis to be path-table-operated is set to 1, and the number of the path table to be started is saved (Step SX6). Thereupon, the procedure proceeds to Step SX7. If the command is not the command for starting the path table, on the other hand, the procedure proceeds directly to Step SX7.

In Step SX7, path-table interpolation processing is executed using data on the assigned path table, and a move command as the result of the processing is output to its corresponding servo control section (FIG. 7). Then, the reference value L is read (Step SX8), and it is determined whether or not the reference value (L1, L2, ...) previously read in Step SX3 is reached by the read reference value L (Step SX9). If the command reference value is not reached, the processing of Steps SX7, SX8, SX9 and SX7 is repeatedly executed for each predetermined period. If the command reference value is reached, on the other hand, the procedure returns to Step SX3, and the processing of the subsequent steps is continued.

In the following four cases, it is concluded that the path table start flag for starting the path-table operation for the X-axis is set to 1 in Step SX1:

(1) a case where a command for starting the path table for the X-axis (tabular data Tx) is issued, as in the case of the prior art path-table operation;

(2) a case where a command for starting the path table (tabular data) for operating an arbitrary axis is issued in accordance with the NC program command and the X-axis is assigned as the axis to be operated based on this path table;

(3) a case where a command for starting the tabular data for operating an arbitrary axis is issued in response to a signal and the X-axis is assigned as the axis to be operated based on this tabular data (path table); and (4) a case where a command for starting the path table (tabular data) for operating an arbitrary axis is issued in accordance with the path table for the A-axis (tabular data Ta) and the X-axis is assigned as the axis to be operated based on this commanded path table.

Figure 12:
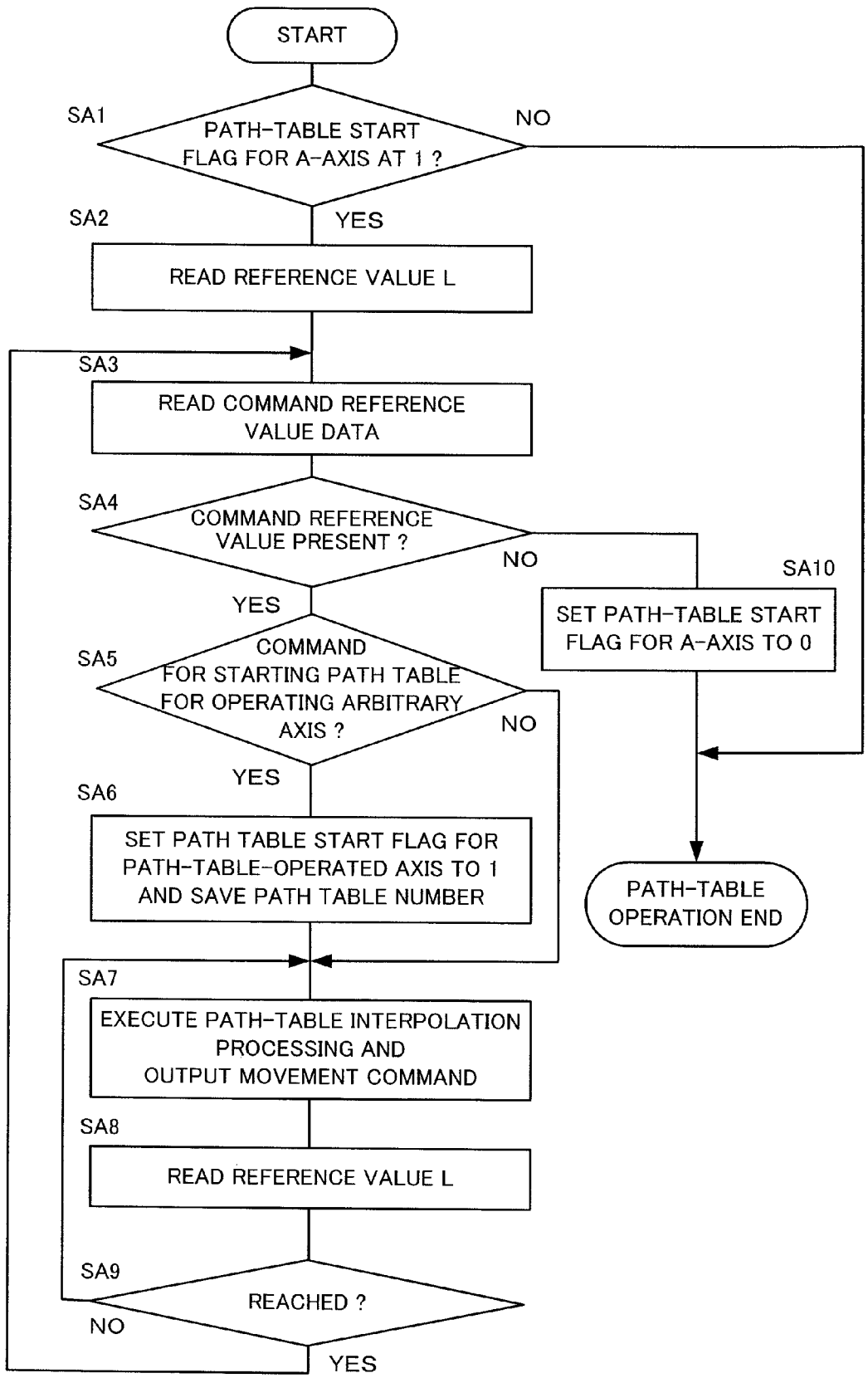
FIG. 12 is a flowchart illustrating A-axis interpolation processing using the tabular data of FIG. 9.

FIG. 12 is a flowchart illustrating A-axis interpolation processing shown in FIG. 9.

The CPU 11 first determines whether or not the flag for starting the path-table operation for the A-axis is set to 1 (Step SA1). If the flag is not set to 1, the path-table operation processing is terminated. If the flag is set to 1, the reference value L (time or the position of a reference spindle) to be sequentially updated is read (Steps SA2). In starting the path table, the reference value L is reset (see "RESET" of the reference value counter 3 shown in FIG. 9).

Subsequently, a command reference value (commanded time or spindle position) and command position data are read from the path table (Step SA3). Then, it is determined whether or not there is a command reference value (Step SA4). If not, the path table start flag for the A-axis is set to 0 (Step SA10), and the path-table operation is terminated. If there is the command reference value, on the other hand, it is determined whether or not the command is a command for starting the path table in order to move an arbitrary axis corresponding to the command reference value (Step SA5).

If it is concluded in Step SA5 that the command is a command for starting the path table, the path table start flag for the axis to be path-table-operated is set to 1, and the number of the path table to be started is saved (Step SA6). Thereupon, the procedure proceeds to Step SA7. If the command is not the command for starting the path table, on the other hand, the procedure proceeds directly to Step SA7.

In Step SA7, path-table interpolation processing is executed using data on the assigned path table, and a move command as the result of the processing is output to its corresponding servo control section (FIG. 7). Then, the reference value L is read (Step SA8), and it is determined whether or not the reference value (L1, L2, . . . ) previously read in Step SA3 is reached by the read reference value L (Step SA9). If the command reference value is not reached, the processing of Steps SA7, SA8, SA9 and SA7 is repeatedly executed for each predetermined period. If the command reference value is reached, on the other hand, the procedure returns to Step SA3, and the processing of the subsequent steps is continued.

In the following four cases, it is concluded that the path table start flag for starting the path-table operation for the A-axis is set to 1 in Step SA1:

(1) a case where a command for starting the path table for the A-axis (tabular data Ta) is issued, as in the case of the prior art path-table operation;

(2) a case where a command for starting the path table (tabular data) for operating an arbitrary axis is issued in accordance with the NC program command and the A-axis is assigned as the axis to be operated based on this path table;

(3) a case where a command for starting the tabular data for operating an arbitrary axis is issued in response to a signal and the A-axis is assigned as the axis to be operated based on this tabular data (path table); and (4) a case where a command for starting the path table (tabular data) for operating an arbitrary axis is issued in accordance with the path table for the X-axis (tabular data Tx) and the A-axis is assigned as the axis to be operated based on this commanded path table.

As shown in FIG. 13, one tabular data for operating one arbitrary axis without axis assignment is created, and a desired (arbitrary) axis is operated based on the created tabular data. In the tabular data shown in FIG. 13, "3" indicates that the tabular data is a third one. Thus, the tabular data is specified by a number, such as 3, and not by an axis name, such as X or A shown in FIG. 4 or 5. A memory capacity for storing path tables can be cut by using the path table without axis assignment illustrated in FIG. 13 in common for a plurality of arbitrary axes.

The tabular data for operating the arbitrary axis without axis assignment, as shown in FIG. 13, can be started in accordance with the NC program shown in FIG. 14.

In a command block "M800Q3R12" of the NC program shown in FIG. 14, "M800" represents an M code for starting the path-table operation. "Q" indicates the use of a third path table. "R12" indicates that the control axes are the X-axis (first axis) and the A-axis (second axis). R1 is commanded in operating the X-axis, and R2 in operating the A-axis. According to this NC program, therefore, the third path table (FIG. 13) for operating arbitrary axes is started as the command "M800Q3R12" is executed, whereupon the X- and A-axes are operated.

The following is a description of a case where the path-table operation described with reference to FIG. 11 or 12 is performed based on the path table shown in FIG. 13 and the NC program shown in FIG. 14.

First, the CPU 11 executes commands for blocks of the machining program shown in FIG. 14 in accordance with the processing shown in the flowchart of FIG. 10 (Step S6). Then, the CPU 11 reads the block "M800Q3R12" of the machining program (Step S2), concludes the read block to be a command for path-table operation (Step S3), and sets path table start flags for commanded axes (X- and A-axes in this case) to 1 (Step S4). Thereafter, the number (3 in this case) of the started path table is saved (Step S5).

Then, the command reference value (time or spindle position) L0 is read, and the command position X0 corresponding to the command reference value L0 is read (Step SX3 of the flowchart of FIG. 11). Since the command reference value (=L0) is thus present, the procedure proceeds to Steps SX4, SX5 and SX7 in the order named, whereupon interpolation processing is performed.

When Step SX7 is reached for the first time, neither the next command reference value for the interpolation processing nor the next command position data are read, the procedure proceeds to the subsequent Step SX8, in which the reference value L is read. Then, it is determined whether or not the command reference value L0 is reached by the read reference value L (Step SX9). At the stage of first processing in Step SX9, however, the reference value L and the command reference value L0 are equal (YES in Step SX9), so that the procedure returns to Step SX3 and is continued.

Then, the command reference value L1 and its corresponding command position X1 are read (Step SX3), and the interpolation processing is performed based on the read command reference value L1 (Steps SX7, SX8 and SX9). Likewise, the command reference value L2 and its corresponding command position X2 are then read, and the interpolation processing is performed based on the read command reference value L2. Likewise, moreover, the command reference value L3 and its corresponding command position X3 are read, and the interpolation processing is performed based on the read command reference value L3. A move command is generated by the interpolation processing, and it is output to the servo control section 31 for the X-axis.

When the interpolation processing based on the command reference value L3 is finished, that is, if it is concluded in Step SX9 that L and L3 are equal, the procedure returns to Step SX3, in which an attempt is made to read the next command reference value data. Since there is no command reference position to be read, however, the procedure proceeds from Step SX4 (NO) to Step SX10, in which the path table start flag for the X-axis is set to 0, and the path-table operation is stopped.

Further, the path-table operation for the A-axis is performed using the same path table for the X-axis. Since the contents of processing are the same as those for the X-axis described above, their description is omitted. Since the X- and A-axes share the reference value L and the path table contents in common, furthermore, they may be configured also to share the move command. For example, the move command in Step SX7 of FIG. 11 may be input not only to the servo control section for the X-axis but also to the servo control section for the A-axis.

FIG. 15 shows an example of a signal for starting a path table for operating an arbitrary (or unassigned) axis. While the signal to be started is represented by a code "G0700", the code name may be set suitably. The code "G0700" is formed of an eight-bit signal, and a path table start (PTS) signal is represented by a bit "#0". In starting the path table, the PTS is set to 1. The signal "G0700" is a signal that is output to the numerical controller after signals from the various switches on the control panel (not shown) on the main body of the machine tool are received by the PMC and properly processed in sequence control of the machine tool (especially, control of spindle rotation, tool replacement, and machine control panel).

When a signal PTS<G700.0> shown in FIG. 15 becomes 1, path tables of path table numbers assigned by signals PTN1 to PTN8<G0701.0 to G0701.7> shown in FIG. 16 are started, and axes of axis numbers assigned by signals PTA1 to PTA8<G0702.0 to G0702.7> shown in FIG. 18 is operated.

FIG. 16 shows a signal that specifies a path table for operating an arbitrary axis. This signal is an eight-bit signal represented by "G0701". As shown in FIG. 17, first to $225^{th}$ tables can be specified by assigning each bit of the signal "G0701". The number of specifiable path tables can be increased by increasing the number of bits of the signal "G0701".

FIG. 18 shows a signal that specifies the axis number of an axis to be operated for a path table for operating an arbitrary axis. This signal is an eight-bit signal represented by "G0702". Each bit can specify the axis number of an axis to be operated for the path table for operating the arbitrary axis.

As shown in FIG. 19, the axis number of the axis to be operated is specified by the signal "G0702" for the path table for operating the arbitrary axis. In operating the X- and A-axes, G702.0=1 and G702.1=1 are set.

FIG. 20 shows another path table for starting the path table for operating an arbitrary axis and assigning an axis to be operated based on the started path table.

In the path table shown in FIG. 20, "7000_X" in this path table represents the $7000^{th}$ path table for the X-axis. In "Q3F12" of the path table, "Q3" indicates that the path table for operating the arbitrary axis is a third one, and "F12" indicates that the control axes are the X-axis (first axis) and the A-axis (second axis). F1 is commanded in operating the X-axis, and F2 in operating the A-axis. As shown in FIG. 20, a command "Q3F12" is executed with the reference value L2, whereupon the third path table (FIG. 13) for operating arbitrary axes is started, and the X- and A-axes are operated. According to this embodiment, the X-axis is operated with the sum of a movement amount based on data of a $7000^{th}$ path table and a movement amount based on data of the third path table.

What is claimed is:

1. A numerical controller, which comprises a storage device for storing tabular data, in which a position of a spindle or an axis as a control object is caused to correspond to a reference value composed of time or the position of a reference spindle or axis, and a reading device for successively reading a reference value in the tabular data and a position of the spindle or the axis as control object corresponding to the reference value from the storage device, and controls the position of the spindle or the axis as control object based on the reference value read by the reading device, the tabular data stored in the storage device being configured to operate one arbitrary axis, the numerical controller further comprising:
   an assignment device for assigning the axis to be operated in accordance with the tabular data; and
   a starting device for starting the tabular data stored in the storage device, thereby causing the axis assigned by the assigning device to operate.

2. The numerical controller according to claim 1, wherein the starting device is an NC program command, signal input, or a command for some other tabular data.

3. The numerical controller according to claim 2, wherein the assigning device is an NC program command, signal input, or a command for the other tabular data constituting the starting device.

* * * * *